(12) United States Patent
Wise

(10) Patent No.: US 9,376,130 B1
(45) Date of Patent: Jun. 28, 2016

(54) SELF-JACKING MOBILE SAW STAND WA9940

(76) Inventor: Robert W. Wise, Petaluma, CA (US)

( * ) Notice: Subject to any disclaimer, the term of this patent is extended or adjusted under 35 U.S.C. 154(b) by 2738 days.

(21) Appl. No.: 11/888,378

(22) Filed: Jul. 31, 2007

Related U.S. Application Data

(63) Continuation-in-part of application No. 29/271,267, filed on Jan. 12, 2007, now Pat. No. Des. 566,735.

(51) Int. Cl.
*B62B 1/02* (2006.01)
*B62B 1/04* (2006.01)
*B62B 1/12* (2006.01)

(52) U.S. Cl.
CPC .. *B62B 1/042* (2013.01); *B62B 1/12* (2013.01)

(58) Field of Classification Search
USPC .......... 280/47.24, 47.25, 47.27, 47.28, 47.33, 280/30, 47.19, 639, 38, 641, 652, 645, 659, 280/638, 47.2, 47.18
See application file for complete search history.

(56) References Cited

U.S. PATENT DOCUMENTS

| | | | | |
|---|---|---|---|---|
| 1,864,840 A * | 6/1932 | Lehner | ........................... | 144/287 |
| 3,893,687 A * | 7/1975 | Victor | ........................ | 280/47.27 |
| 4,068,551 A * | 1/1978 | Kreitz | ........................... | 83/471.3 |
| 4,106,381 A * | 8/1978 | Kreitz | ........................... | 83/477.2 |
| 4,230,329 A | 10/1980 | Johnson | | |
| 4,248,115 A * | 2/1981 | Brodbeck et al. | .......... | 83/435.27 |
| 4,284,286 A * | 8/1981 | Lewallen | ........................ | 280/30 |
| 4,341,247 A * | 7/1982 | Price | ............................. | 144/287 |
| 4,561,336 A * | 12/1985 | Davis | ............................... | 83/859 |
| 4,955,941 A | 9/1990 | Rousseau | | |
| 4,967,672 A * | 11/1990 | Leather | ......................... | 108/120 |
| 5,067,535 A * | 11/1991 | Wolff | ......................... | 144/286.1 |
| 5,087,013 A * | 2/1992 | Gress et al. | .................... | 248/676 |
| 5,105,862 A * | 4/1992 | Skinner et al. | ................ | 144/287 |
| 5,255,724 A | 10/1993 | Butke | | |
| 5,560,582 A * | 10/1996 | Beelen | .......................... | 248/588 |
| 5,642,898 A | 7/1997 | Wise | | |
| 5,957,472 A * | 9/1999 | Borgatti | .......................... | 280/30 |
| 6,328,319 B1 * | 12/2001 | Stahler, Sr. | ................ | 280/47.18 |
| 6,345,829 B1 * | 2/2002 | Mueller | ..................... | 280/47.18 |
| 6,578,856 B2 * | 6/2003 | Kahle | ............................. | 280/30 |
| 6,886,836 B1 * | 5/2005 | Wise | ............................. | 280/30 |
| D523,041 S | 6/2006 | Wise | | |
| 7,059,616 B2 * | 6/2006 | Wu | ............................ | 280/47.24 |
| 7,213,829 B2 * | 5/2007 | Wu | ............................... | 280/645 |
| 7,222,865 B2 * | 5/2007 | Chen et al. | ..................... | 280/30 |
| 7,255,355 B2 * | 8/2007 | Chisholm et al. | ............... | 280/30 |
| 7,331,596 B2 * | 2/2008 | Tiramani et al. | ............. | 280/643 |
| 7,494,149 B2 * | 2/2009 | Liu et al. | ....................... | 280/639 |
| 7,588,255 B2 * | 9/2009 | Katz | ............................ | 280/47.27 |
| 7,631,847 B2 * | 12/2009 | Harrison et al. | ........... | 248/316.1 |
| 2002/0125662 A1 * | 9/2002 | Magness | ......................... | 280/30 |
| 2005/0199768 A1 * | 9/2005 | Tam et al. | ..................... | 248/129 |
| 2006/0038383 A1 * | 2/2006 | Wu | ............................... | 280/652 |
| 2006/0076756 A1 * | 4/2006 | Wu | ............................... | 280/652 |

* cited by examiner

*Primary Examiner* — Joseph Rocca
*Assistant Examiner* — Travis Coolman
(74) *Attorney, Agent, or Firm* — Lowe Graham Jones PLLC

(57) ABSTRACT

A self-jacking, mobile power tool stand has an extended or erect position and a collapsed position. The geometry of various components of the stand facilitates self-erection of the stand to the raised position and the jacking of a pair of wheels off the floor so as to minimize vibrations from the power tool during operations. Conversely, when in the closed position, the stand can be used to transport the power tool in the manner of a conventional two-wheeled handtruck.

15 Claims, 7 Drawing Sheets

SELF-JACKING MOBILE SAW STAND
WA9940

CROSS-REFERENCE TO RELATED APPLICATION

This application is a continuation-in-part of U.S. patent application Ser. No. 29/271,267 now U.S. Pat. No. D566,735, entitled "Miter Saw Workbench," filed on Jan. 12, 2007 and claims the benefit of the filing date thereof under 35 USC §120.

TECHNICAL FIELD

The invention relates to mobile stands for powered tools. More specifically, the invention relates to mobile stands for power tools such as miter saws, chop saws, task saws, compound sliding circular saws and the like.

BACKGROUND OF THE INVENTION

Portable, wheeled tool carts have been available for some time. One such prior art tool cart is shown and described by Wise, the inventor herein, in U.S. Pat. No. 5,642,898 issued Jul. 1, 1997. Additional tool carts have been described in the patent literature. For instance, U.S. Pat. No. 4,955,941, issued Sep. 11, 1990, to Rousseau, describes a support table for a bench saw. U.S. Pat. No. 4,230,329, issued Oct. 28, 1980 to Johnson, describes a mobile cart. U.S. Pat. No. 5,161,590, issued Nov. 10, 1992, to Otto, describes a miter saw table apparatus. U.S. Pat. No. 5,255,724; issued Oct. 26, 1993, to Butke, describes an adjustable extension assembly. A brochure showing the Rousseau SS2850 product discloses a mobile miter saw stand. U.S. Pat. No. 6,886,836 entitled "Counterbalanced Universal Mobile Saw Stand," issued May 3, 2005 to the inventor herein discloses a built-in handtruck design that enables the end user to transport common table saws and equipment to the location of the project being undertaken. The unit quickly folds out into a fully supporting workbench for actual use of the saw and/or equipment. The saw stand shown in the '836 patent is a significant advance in the art in that the device disclosed therein permits a heavy power saw, such as a table saw to be transported to or from a jobsite on roller wheels in the manner of a conventional handtruck. The saw can then be used with the saw stand in a collapsed position (e.g., low to the ground) or in a raised position at table height. This saw stand has a built-in feature that enables the unit to stand in the vertical position with the saw attached. This creates ease in transporting the unit to and from the workplace, i.e., in elevators, truck beds, etc. Also built into the design is the ability to use the saw in the horizontal stowed position for hardwood floor installers, etc.

This unit is constructed of powder-coated tubular steel and sheet metal. Ergonomic handles and lockout devices are incorporated into each aspect of this unit for ease of use, safety, and product longevity. Quick automatic latch mechanisms are an integral part of the unit for the flip-out support leg and the saw table surface. These latches are automatic in the setup mode and require manual release for returning the unit to the stowed position.

One disadvantage of this prior art design, as well as other prior art designs discussed above, is that when the saw stand is in the extended or raised position, a significant part of the load is borne by the wheels. On a smooth, flat surface (e.g., a garage floor, hardwood floors, etc.) vibrations from the saw tend to cause minor movement in the wheels, thus allowing undesirable vibrations to become amplified through positive feedback and reverberate through the saw stand.

Thus, a need exists for a mobile, collapsible power tool stand that can roll on wheels, but that also lifts the saw stand off the wheels when erected or extended.

SUMMARY OF THE INVENTION

It is therefore an object of the present invention to provide a collapsible mobile power tool stand, such as a saw stand that permits the power tool or saw to be rolled to and from a jobsite on wheels in a handtruck-like design.

It is a further object of the present invention to provide a mobile power tool stand that achieves the above object and which also lifts the power tool stand off the wheels when the stand is erected or extended.

It is yet another object of the present invention to provide for a power tool stand that achieves the above objects and which also facilitates self-erection of the saw stand with application of minimal physical force by the user, even with a heavy power tool, such as a table saw, attached to the stand.

The invention achieves the above objects, and other objects and advantages that will become apparent from the description which follows, by providing a collapsible, self-jacking mobile power tool stand. The stand includes an elongated power tool bed having two ends for supporting a power tool, or an intermediate plate to which a power tool, such as a table saw, chop saw, band saw, or the like may be attached. The stand has a substantially handtruck-shaped bed support having an upper end slidably connected to the power tool bed, such as by a track or pair of tracks. The bed support has an intermediate lever arm portion, and a distal foot portion having a preselected length terminating in a free end and forming a preselected foot portion angle with respect to the lever arm portion. The bed support is movable between stowed and extended positions with respect to the power tool bed. A swing-out leg, or pair of swing-out legs have upper ends pivotally connected adjacent to the power tool bed first end. Each leg has a distal free end for contacting a substantially planar surface, such as the ground. The leg or legs are pivotable between stowed and extended positions with respect to the power tool bed. A strut or struts having first end(s) pivotally connected adjacent the power tool bed first end have second distal ends pivotally connected to the bed support so as to be pivotal between stowed and extended positions. A wheel or pair of wheels having a preselected radius are rotatably connected to the bed support for rolling the stand on the support surface when the bed support, strut or struts, and leg or legs are locked into their respective stowed positions in the conventional manner of a handtruck. When the bed support, strut or struts, and leg or legs are in their extended positions, the wheels are lifted from the support surface, such as the ground, and the stand is primarily supported by the leg or legs and the foot portion free end. In this manner, the vibrations from the power tool on the power tool bed are transmitted directly into the support surface and are damped thereby.

In its preferred embodiment, the bed interior angles between the power tool bed, bed support, and struts are acute angles and the free end of the lever arm foot portion is positioned at a distance d from a diameter of the wheel normal to the support surface along a tangent to the wheel in contact with the support surface wherein d is equal to or greater than approximately the radius of the wheel R and approximately equal to or less than R/tan (90° minus the acute angle between the power tool bed and bed support). In this way, the intermediate lever arm portion of the bed support, when advanced toward the second end of the power tool bed and past the vertical, acts as a lever to "jack up" the wheel or wheels off the support surface (e.g., ground) with minimal effort in an over-center fashion. Thus, the weight of the power tool on top of the bed support assists in the self-jacking operation. Furthermore, biasing mechanisms may be interconnected between the strut or struts and the power tool bed to facilitate erection of the stand with a heavy load on the bed support, such as a power tool or the like. In the preferred embodiment, the acute angle between the power tool bed and the intermediate lever arm portion of the bed support is approximately 75 degrees when extended, and the preselected angle between the intermediate lever arm portion of the bed support and the foot portion is approximately 90 degrees, as in a conventional two-wheeled handtruck.

BRIEF DESCRIPTION OF THE DRAWINGS

FIG. 5A is an enlarged view of circled area 5A in FIG. 5.

FIG. 5B is an enlarged, sectional view of circled area 5B in FIG. 5.

DETAILED DESCRIPTION OF THE PREFERRED EMBODIMENTS

Figure 1:
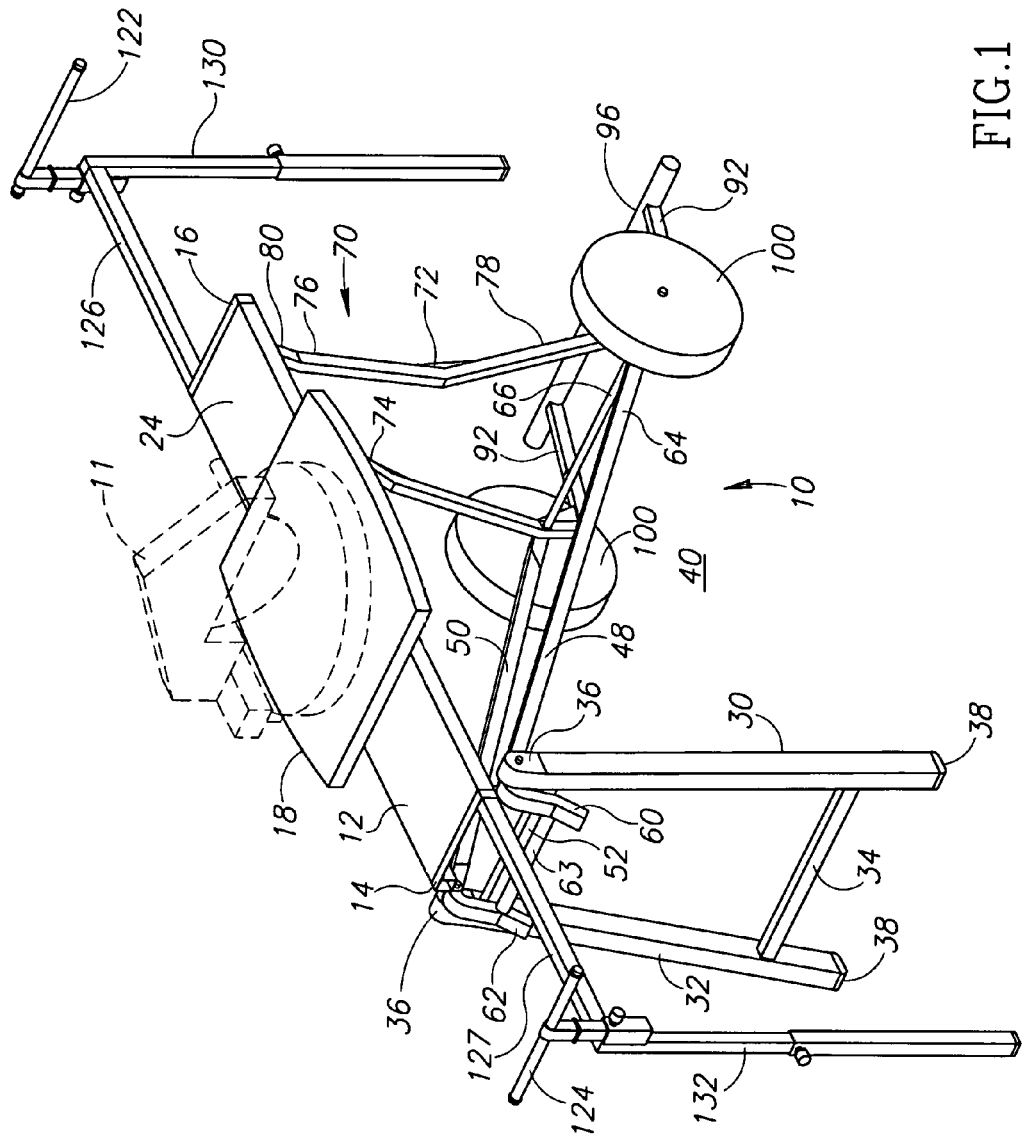
FIG. 1 is a perspective, environmental view of a self-jacking mobile power tool stand in the extended position supporting an exemplary chop saw.
Figure 2:
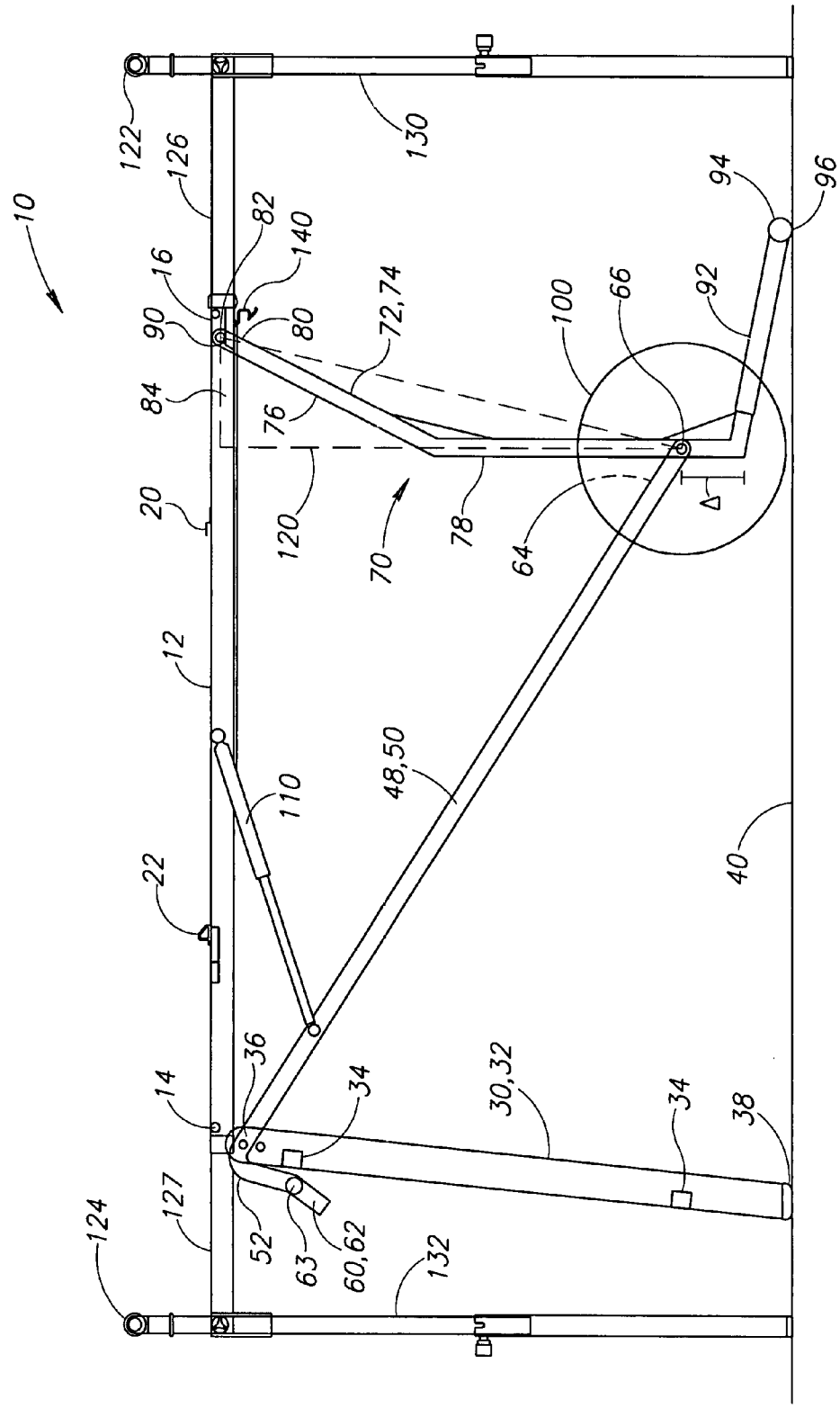
FIG. 2 is a side elevational view of the stand shown in FIG. 1.

A self-jacking mobile power tool stand in accordance with the principles of the invention is generally indicated at reference numeral 10 in the various Figures of the attached drawings, wherein numbered elements in the Figures correspond to like numbered elements herein. FIGS. 1 and 2 generally show the stand 10 in an extended or raised position for use of the stand at table height, whereas FIG. 4 illustrates the stand 10 in a collapsed position for transporting a powered tool 11, such as a table saw, chop saw, sliding compound miter saw or the like, in a handtruck-like fashion, or for use of the powered tool at a low elevation, such as for carpentry work involving floor moldings and the like.

Figure 7:
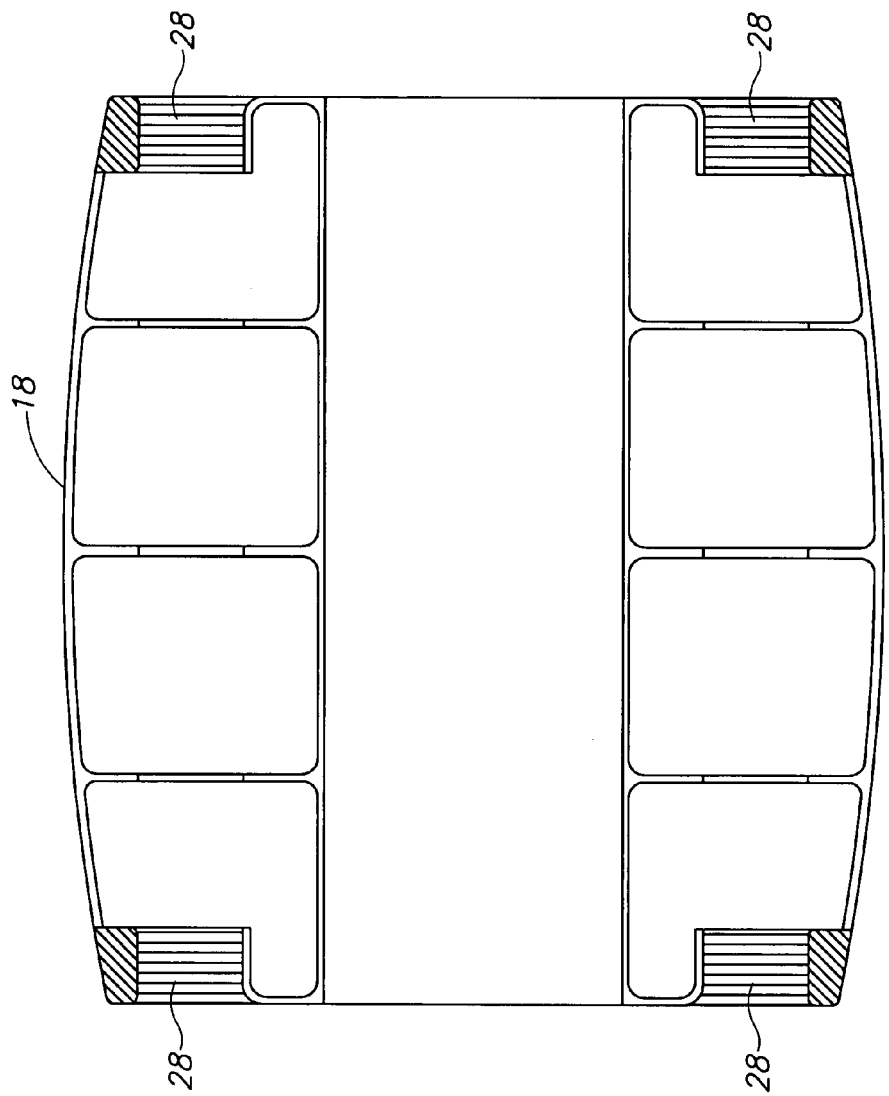
FIG. 7 is a bottom plan view of a saw mounting plate for use with the mobile power tool stand.

With reference to FIGS. 1 and 2, the power tool stand 10 includes an elongated, power tool bed 12 having a first end 14 and a second end 16 for supporting a power tool or the like on a removable saw mounting plate 18 shown in FIG. 7. The power tool, such as a table saw, is mounted to the plate 18 by conventional bolts (not shown) or the like while the plate itself is received in a clip 20 and a spring-loaded latch 22 on a top side 24 of the bed 12. The latch 22 has a handle 26 that may be operated by the user to release the latch and remove the plate 18 from the bed 12. In this way a user may decouple the saw/plate combination from the collapsed stand 10 to lighten lifting requirements for loading the equipment in a pickup truck bed or the like. To this end, the plate 18 is provided with hand held recesses 28 adjacent to each corner of the plate.

Figure 5:
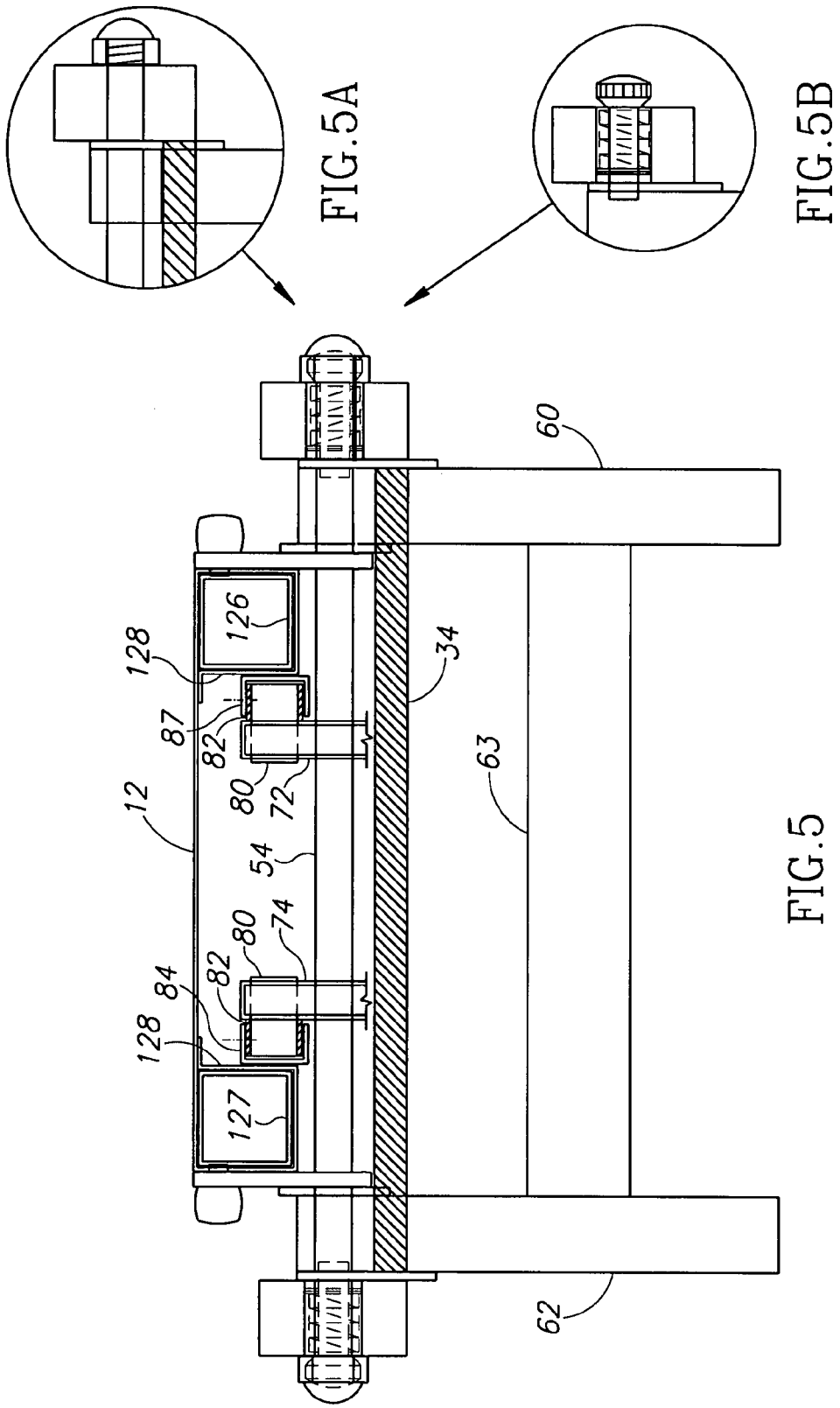
FIG. 5 is a sectional view taken along line 5-5 of FIG. 4.
Figure 6:
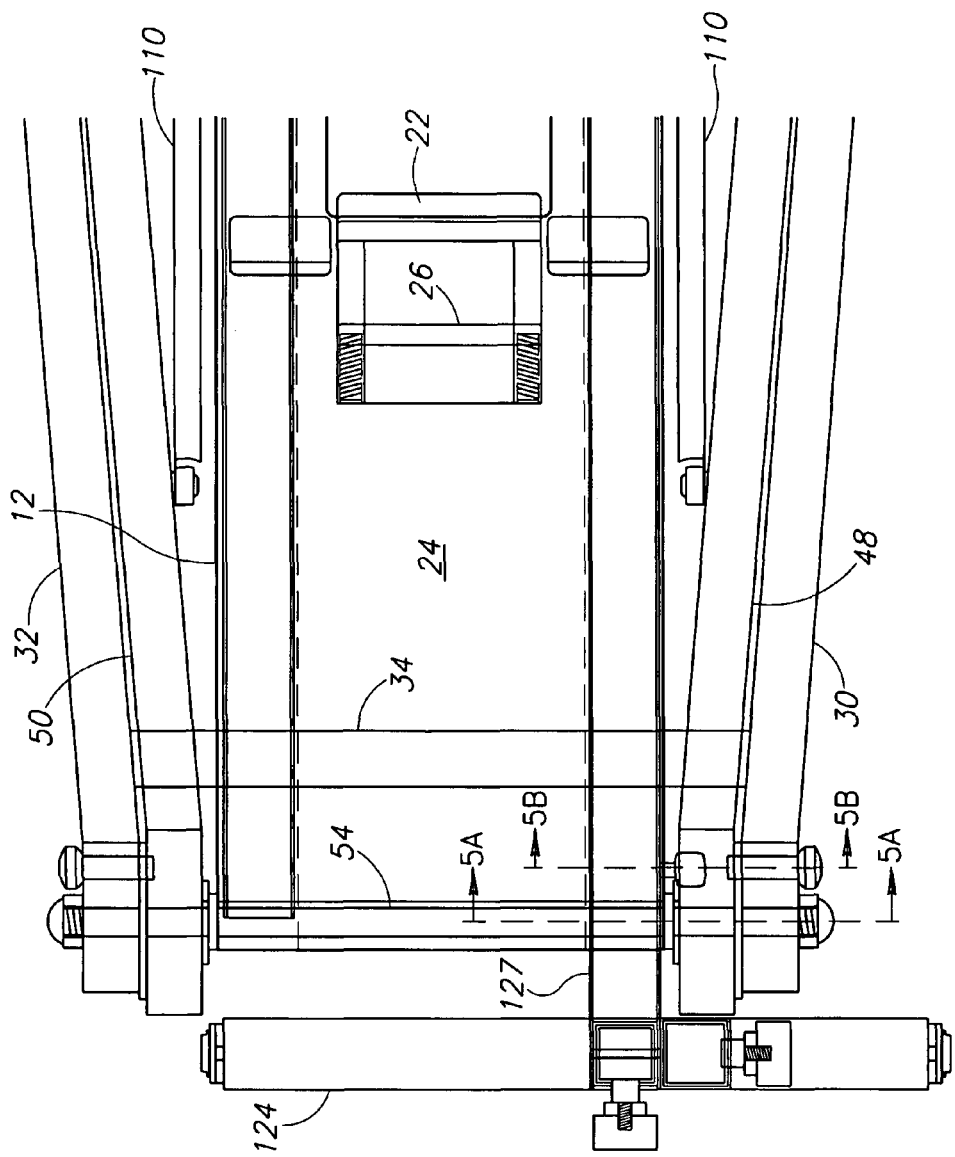
FIG. 6 is a partial, top plan view of a first end of the stand in the collapsed position.

A pair of swing-out legs 30, 32 connected by crossbraces 34 have upper ends 36 pivotally connected to the first end 14 of the power tool bed 12. The legs have distal free ends 38 capped by rubber feet for contact with a support surface 40, such as the ground. The power tool stand 10 also has a pair of struts 48, 50 each having a first end 52 also pivotally connected to the power tool bed first end 14 coaxially with the swing-out legs 32, 34, such as about a tool bed axle 54, best seen in FIG. 6. The first ends 52 of the struts have perpendicularly extending handle portions 60, 62 interconnected by a handle crossbar 63 that also serves as a handle correlating to the handle on a conventional two-wheeled handtruck, as will be described further hereinbelow. The struts also each have a distal second end 64 that is pivotally connected by a wheel axle 66 to a generally "L"-shaped or handtruck-shaped bed support generally indicated at reference numeral 70. The bed support has a pair of intermediate lever arm portions 72, 74 each having an upper part 76 and lower part 78 connected at an obtuse angle so that the various parts of the stand may stow together closely as shown in FIG. 4 without mechanical interference. An upper end 80 of each lever arm portion is provided with a roller 82, (best seen in FIG. 5) that is received in an interior track 84 connected to the underside of the power tool bed 12. As best seen in FIG. 2, the track 84 extends from the second end 16 of the power tool bed 12 approximately midway toward the first end 14. The track 84 is provided with an upward detent or groove 90 to receive the rollers 82 at the distal end of the track such that the rollers are captured therein by the gravitational bias of the power tool bed 12 and the power tool received on top of the bed. The intermediate lever arm portions 72, 74 are provided with a perpendicularly extending foot portion 92 terminating in a foot portion free end 94 in the form of a cylindrical, transverse bar 96. The wheel axle 66 is journalled through the lower parts 78 of the lever arm portions 72, 74 so as to support a pair of wheels 100 laterally external to the struts 48, 50.

Figure 4:
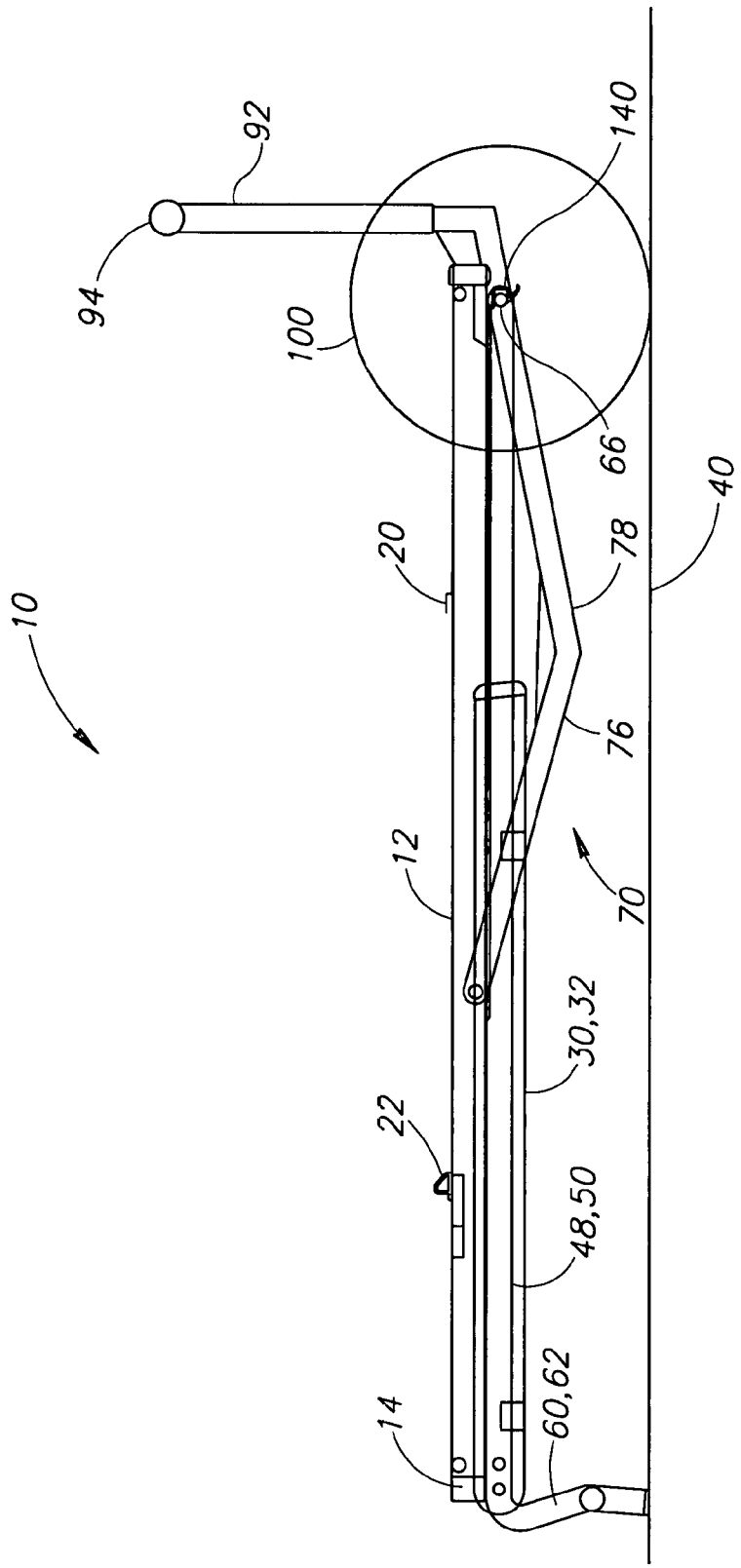
FIG. 4 is a side elevational view of the stand shown in FIG. 1 in a collapsed and/or stowed position.

As best seen in FIG. 4, the handle portions 60, 62 and pair of wheels 100 support the power tool stand 10 on the support surface 40 when the saw stand is in the collapsed position; however, when the stand is in the extended or erect position shown in FIG. 2, the stand is primarily supported by the pair of swing-out legs 30, 32 and the free end 94 of the lever arm foot portion 92 so as to isolate the wheels 100 from the ground. In this manner, vibrations from the power tool or the like on the saw plate 18 are transmitted directly through the saw stand to the ground, rather than being introduced into the wheels, which may serve to reflect and/or amplify those vibrations.

In order to provide the self-jacking function described above, a pair of spring-loaded hydraulic cylinders 110 are preferably pivotally connected to both the power tool bed 12 and one of each of the struts 48, 50. Furthermore, as shown with reference to the freebody diagram shown in FIG. 3, a preferred geometry is selected for the power tool stand 10 such that an acute angle α is formed between the power tool bed 12 and the struts 48, 50 when the stand 10 is in the extended or erect position. The bed 12 and lever arm portions 72, 74 preferably form an acute angle β therebetween such that the upper ends 80 of the lever arm portions are beyond a normal line 120 with respect to the support surface or ground 40 in the manner of an overcenter latch to assist the user when drawing the upper part 76 of the lever arm portions 72, 74 toward the second end 16 of the power tool bed 12. The user achieves this action merely by lifting the second end 16 of the power tool bed 12 after the swing-out legs 30, 32 have been deployed such that the hydraulic cylinders 110 assist in raising the bed. Once the rollers 82 (and hence the upper end 80 of each lever arm portion 72, 74) have passed the vertical 120, the weight of the table saw or the like on the power tool bed 12 assists in driving the upper parts 76 of the lever arms 72, 74 to the positions shown in FIGS. 2 and 3 (i.e., to the right is shown in FIGS. 1 and 2). Furthermore, the lever arm portions 72, 74 preferably have a length approximately 2.5 times that of the length l of the foot portion 92 such that only 40% of the weight on the power tool bed 12 is required to "jack" the free end 94 of the foot portion 92 into the position shown in FIG. 2, wherein the wheels 100 are lifted from the support surface or floor 40. It can be shown through the use of the geometric laws, including the law of similar triangles, complementary angles, and the like, that the angle θ between the lever arm portion 72, 74 and the normal line 120 is equal to 90 degrees −β and that the angle between the foot portion 92 and the ground or support surface 40 is also θ. Thus, by trigonometry it can be stated that, when the wheels 100 are in contact with the support surface or ground 40, the free end 94 of the foot portion 92 will be at a distance d equal to the radius of the wheel R divided by the tangent of the angle θ. It has been determined that, if the angle between the intermediate lever arm portions 72, 74 and the foot portion 92 is approximately a right angle, the free end 94 of the foot portion 92 should have a length l selected such that the distance d is in the range of approximately between the radius R of the wheels 100 divided by the tangent of θ. As shown in FIG. 2, however, if the lower part 78 of each lever arm portion 72, 74 extends below the center of rotation of the wheel (i.e., the wheel axle 66) by distance Δ the length l of the foot portion 92 is modified according to the formula:

$$l = d/\cos\theta; \text{ wherein } d = h/\text{tangent of }\theta = (R-\Delta)/\tan(90\text{ degrees}-\beta).$$

Figure 3:
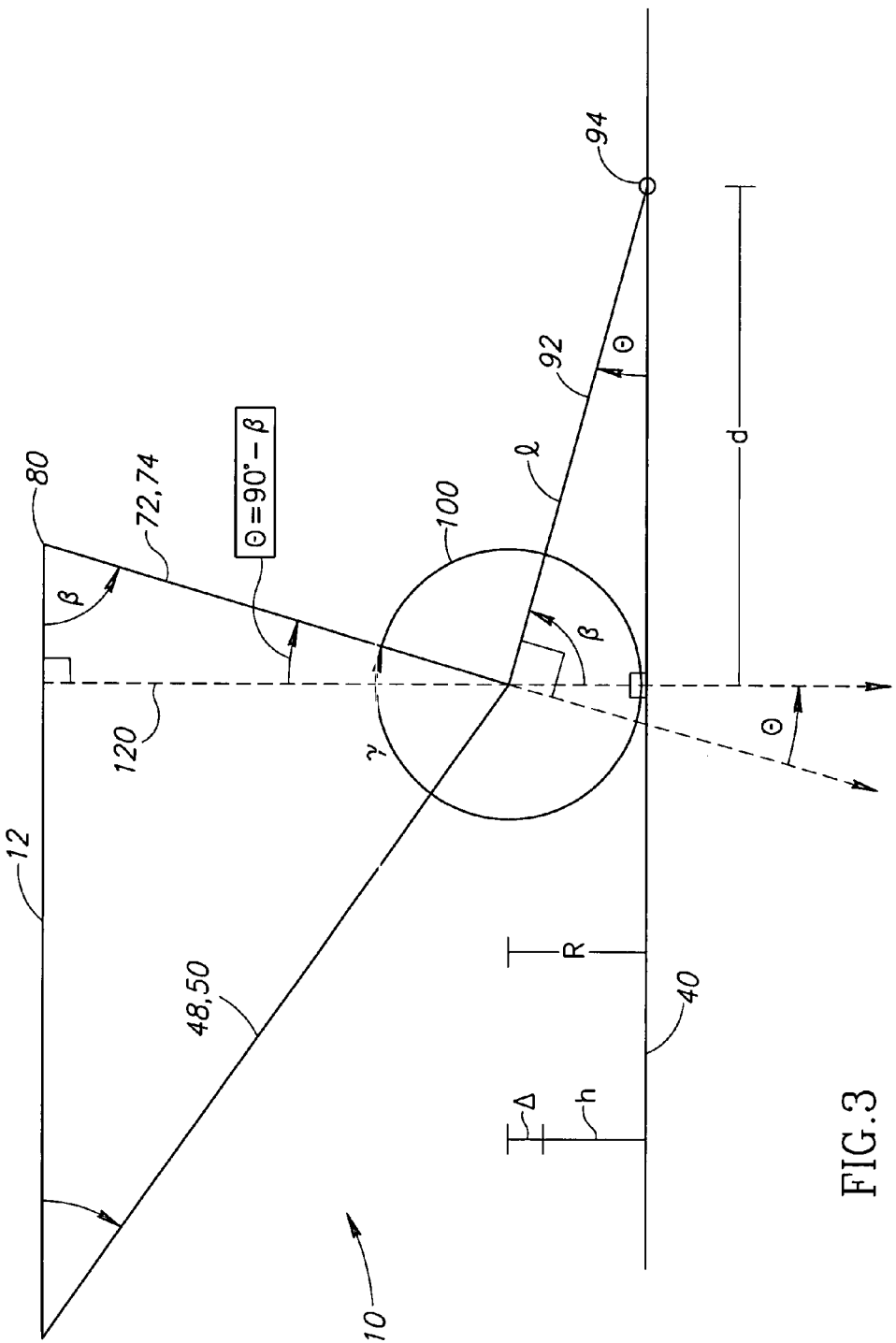
FIG. 3 is a freebody diagram of the essential structural elements, and angular relationship therebetween shown in FIG. 2.

In the preferred embodiment of the invention, the angle α is approximately equal to 35 degrees; and the angle β is approximately equal to 75 degrees. Thus, an angle γ between the struts 48, 50 and the lever arm portions 72, 74, as shown in FIG. 3, is approximately 70 degrees. Thus, θ being equal to 90 degrees −β is approximately 15 degrees and the distance l, as shown in FIG. 3, is approximately 23.18 inches if the radius R of the wheels 100 is approximately 6 inches. However, as shown in FIG. 2, the foot portion 92 is displaced downwardly from the wheel axle 66 by approximately 2.17 inches; thus, using the above formulas the foot portion 92 has approximately a length of 14.8 inches.

As stated above, FIG. 3 is a freebody diagram of the structure shown in FIG. 2. As shown in FIG. 2, the foot portion free end 94 has a cylindrical transverse bar 96 having a nonzero diameter. Transverse bar 96 has a diameter of approximately 1.38 inch. Thus, utilizing the dimensions and angles discussed above the wheel 100 will be raised 0.69 inch off the support surface or ground 40 when all of the relevant elements are in their extended position, as shown in FIGS. 1 and 2. These dimensions and angles have been determined to be optimal to raise the wheels 100 out of contact with the ground while maintaining a low required lifting force to raise the power tool bed 12 to its extended position.

The mobile power tool stand 10 may optionally be provided with infeed and outfeed rollers of the conventional type 122, 124 located laterally by transverse bars 126, 127 that in turn are received in square cross-section tubes 128 that are integral with the power tool bed 12. The rollers are supported in the conventional manner by telescoping support members 130 and 132. The second end 16 of the power tool bed 12 is preferably provided with a spring-loaded axle latch 140 to secure the wheel axle 100 to the power tool bed 12 when in the collapsed position shown in FIG. 4.

In view of the above, it will be apparent to those of ordinary skill in the art that the self-jacking, mobile power tool stand 10 shown and described above provides a means for supporting a conventional power tool, such as a table saw or chop saw in a waist-height position, as shown in FIG. 2, such that the transport wheels 100 are lifted off the ground 40 to reduce vibrations during operation. In addition, the stand 10 may be collapsed and locked by the axle latch 140 and as shown in FIG. 4, to permit the power tool, such as a table saw, to be used at floor level, for example, for carpentry work involving floor moldings. The mobile power tool stand, when in the collapsed position shown in FIG. 4 may also be used to transport the power tool in a fashion similar to a conventional two-wheeled handtruck. Conversely, the saw mounting plate 18 may be detached from the power tool bed 12 by operation of the latch 22 and the combination power tool/mounting plate laid on the foot portion 92 and transported in the conventional two-wheeled handtruck fashion Those of ordinary skill in the art will conceive of other alternate embodiments of the invention upon reviewing this disclosure. Thus, the invention is not to be limited to the above description, but is to be determined in scope by the claims that follow.

I claim:

1. A collapsible, self-jacking mobile power tool stand, comprising:
   an elongated power tool bed having first and second ends for removably supporting a power tool;
   a substantially handtruck-shaped bed support having an upper end laterally slidably connected to the power tool bed, an intermediate lever arm portion and a distal foot portion having a preselected length terminating in a free end and forming a preselected foot portion angle with respect to the lever arm portion, wherein the bed support is movable with respect to the power tool bed between stowed and extended positions;
   a pair of swing-out legs having upper ends pivotally connected adjacent the power tool bed first end and distal free ends for contacting a substantially planar support surface, the legs being pivotable between stowed and extended positions;
   a pair of struts, each strut having a first end pivotally connected adjacent the power tool bed first end and a distal second end pivotally connected to the bed support so as to be pivotable between stowed and extended position forming an angle α between each strut and the power tool bed in the extended position; and,
   a pair of wheels each having a preselected radius R and being rotatably connected to the bed support for rolling the stand on the support surface when the bed support, struts, and legs are in their respective stowed positions and so that when the bed support, struts, and legs are in their respective extended positions the wheels are lifted from the support surface and the stand is primarily supported by the leg and the foot portion free ends, including a biasing mechanism interconnected between the struts and the power tool bed to at least partially counterbalance a power tool on the power tool bed and to bias the struts and the bed support toward their respective extended positions.

2. The power tool stand of claim 1, wherein the bed support upper end is substantially adjacent the power tool bed second end when in the extended position such that the bed support lever arm portion and the power tool bed form an acute angle β with respect to each other.

3. The power tool stand of claim 2, wherein the angle α is acute and wherein the struts each form an acute angle γ with respect to the bed support when the struts and bed support are in their respective extended positions.

4. The power tool stand of claim 3, wherein $\alpha$, $\beta$, and $\gamma$ are approximately equal to 35, 75, and 70 degrees, respectively.

5. The power tool stand of claim 4, wherein R is approximately equal to 6 inches and d is approximately equal to 14.29 inches.

6. The power tool stand of claim 5, wherein the bed support free end is substantially tubular and has a diameter of approximately 1.38 inches.

7. The power tool stand of claim 2, wherein the foot portion free end is positioned a distance d from a diameter of one of the wheels normal to the support surface along a tangent of the one wheel in contact with the support surface wherein d is equal to or greater than approximately R and equal to or less than approximately R/tan (90 degrees−$\beta$).

8. A collapsible, self-jacking mobile power tool stand, comprising:
- an elongated power tool bed having first and second ends for supporting a power tool;
- a substantially handtruck-shaped bed support having an upper end laterally slidably connected to the power tool bed, an intermediate lever arm portion and a distal foot portion having a preselected length terminating in a free end and forming a preselected foot portion angle with respect to the lever arm portion, wherein the bed support is movable with respect to the power tool bed between stowed and extended positions;
- a swing-out leg having an upper end pivotally connected adjacent the power tool bed first end and a distal free end for contacting a substantially planar support surface, the leg being pivotable between stowed and extended positions;
- a strut having a first end pivotally connected adjacent the power tool bed first end and a distal second end pivotally connected to the bed support, so as to be pivotable between stowed and extended positions, forming an angle $\alpha$ between the strut and the power tool bed in the extended position; and,
- a wheel having a preselected radius R and being rotatably connected to the bed support for rolling the stand on the support surface when the bed support, strut, and leg are in their respective stowed positions and so that, when the bed support, strut, and leg are in their respective extended positions, the wheel is lifted from the support surface and the stand is primarily supported by the leg and the foot portion free ends, including a biasing mechanism interconnected between the strut and the power tool bed to at least partially counterbalance a power tool on the power tool bed and to bias the strut and the bed support toward their respective extended positions.

9. The power tool stand of claim 8, wherein the bed support upper end is substantially adjacent the power tool bed second end when in the extended position such that the bed support lever arm portion and the power tool bed form an acute angle $\beta$ with respect to each other.

10. The power tool stand of claim 9, wherein the angle $\alpha$ is acute and wherein the strut forms an acute angle $\gamma$ with respect to the bed support when the strut and bed support are in their respective extended positions.

11. The power tool stand of claim 10, wherein $\alpha$, $\beta$, and $\gamma$ are approximately equal to 35, 75, and 70 degrees, respectively.

12. The power tool stand of claim 11, wherein R is approximately equal to 6 inches and d is approximately equal to 14.29 inches.

13. The power tool stand of claim 12, wherein the bed support free end is substantially tubular and has a diameter of approximately 1.38 inches.

14. The power tool stand of claim 9, wherein the foot portion free end is positioned a distance d from a diameter of the wheel normal to the support surface along a tangent of the wheel in contact with the support surface wherein d is equal to or greater than approximately R and equal to or less than approximately R/tan (90 degrees−$\beta$).

15. The power tool stand of claim 8 including a saw plate removably attached to the power tool bed by a spring loaded latch mechanism.

* * * * *